United States Patent Office 3,265,707
Patented August 9, 1966

3,265,707
PROCESS OF PREPARING 3,4,5-TRIAMINO-4H-1,2,4-TRIAZOLE
Ralph Grassing Child, Pearl River, N.Y., assignor to American Cyanamid Company, Stamford, Conn., a corporation of Maine
No Drawing. Filed Nov. 14, 1963, Ser. No. 323,582
3 Claims. (260—308)

This invention relates to a novel process of preparing 3,4,5-triamino-4H-1,2,4-triazole, known by the trivial name guanazine, and having the formula:

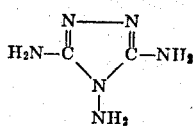

Guanazine is an aminoplast resin and has usefulness, for example, in the preparation of decorative laminates.

Guanazine has heretofore been prepared by the reaction of thiosemicarbazide and lead oxide, according to the method of Stollé and Dietrich, J. Prak. Chem., 139, 193 (1934). This process ordinarily results in yields of only about 20%.

In accordance with the present invention it has been discovered that guanazine can be produced as a purer product and in higher yields, around 75%, by the reaction of dimethylcyanamide with hydrazine. Ordinarily the reaction is carried out without use of a solvent, although an inert solvent such as a lower alkanol or the like may be used. A mixture of approximately equimolar amounts of dimethylcyanamide and hydrazine is heated to a temperature ranging from about 30° C. to about 250° C., most conveniently about 100° C., by means of a steam bath for a period of time ranging from about one-half hour to about 24 hours, when the reaction is substantially complete. The crude product resulting as a solid may be purified by conventional methods of recrystallization. Either hydrazine hydrate or anhydrous hydrazine may be used in the reaction, but the latter is preferred. Purified guanazine is a crystalline solid, melting at a temperature ranging from about 255° C. to about 265° C., soluble in water but relatively insoluble in other common solvents. Guanazine is basic and forms acid addition salts such as hydrochlorides, hydrobromides and the like.

The invention will be described in greater detail in conjunction with the following specific examples.

Example 1

A mixture of 74 g. (1.0 mole) of dimethylcyanamide and 32.05 g. (1.0 mole) of hydrazine was heated for 20 hours on a steam bath. The resulting solid mass was dissolved in the minimum amount of hot water, decolorized with carbon and treated with four volumes of ethanol. On cooling, faintly pink needles, 28.2 g. (50%), melting point 260–261° dec., were obtained. Addition of more alcohol to the mother liquor and long standing produced a second crop of 14 g., melting point 256–257° dec. giving a combined crude yield of 42.2 g. (75%). A sample recrystallized for analyses from aqueous ethanol melted at 262–263° dec.

*Analysis.*—Calcd. for $C_2H_6N_6$: C, 21.05; H, 5.30; N, 73.65. Found: C, 21.34; H, 5.35; N, 73.00.

The monohydrochloride salt was prepared by dissolving 2.2 g. (0.02 mole) of guanazine in 30 ml. of warm water and titrating to pH 7 with 1.7 ml. (0.02 mole) of concentrated hydrochloric acid. On cooling, filtering and washing with ethanol, there was obtained 2.1 g. of colorless rosettes, melting point 276–277°.

*Analysis.*—Calcd. for $C_2H_7N_6Cl$: C, 15.95; H, 4.68; N, 55.83; Cl, 23.55. Found: C, 16.29; H, 4.71; N, 55.86; Cl, 23.77.

The monohydrobromide salt was prepared in the same manner from 48% hydrobromic acid, giving colorless crystals, melting point 271° dec.

The acid sulfate salt prepared similarly, gave colorless needles, melting point 288–289° dec.

Example 2

A mixture of 1 mole of guanazine and 4 moles of formaldehyde (37%) at pH 9–10 was heated for ten minutes at 92° C. giving a syrup of 50% dissolved solids. This syrup was painted directly on a piece of melamine treated print paper (laminate 1), allowed to dry, and then pressed with a backing of phenolic core stock for 20 minutes at 80 p.s.i.g. steam and 750 p.s.i. to give a typical high pressure decorative laminate. Laminate 2 was formed by first painting a sheet of untreated overlay stock with the guanazine resin syrup. This sheet, after drying, was pressed onto melamine print stock with phenolic core backing as in laminate 1. A part of each laminate was soaked in water at room temperature for 16 hours. No change was observed showing that the guanazine resin had cured to a water resistant state.

I claim:
1. The method of preparing guanazine which comprises contacting dimethylcyanamide and hydrazine at a temperature ranging from about 30° C. to about 250° C. for a period of time ranging from about one-half hour to about 24 hours.
2. The method according to claim 1 in which the reaction is carried out in an inert solvent.
3. The method according to claim 1 in which equal molar amounts of dimethylcyanamide and hydrazine are used and in which the temperature is about 100° C.

No references cited.

HENRY R. JILES, *Acting Primary Examiner.*

A. D. ROLLINS, *Assistant Examiner.*